US008620903B2

(12) United States Patent
Tatemura et al.

(10) Patent No.: US 8,620,903 B2
(45) Date of Patent: Dec. 31, 2013

(54) DATABASE DISTRIBUTION SYSTEM AND METHODS FOR SCALE-OUT APPLICATIONS

(75) Inventors: Junichi Tatemura, Sunnyvale, CA (US); Arsany Sawires, San Jose, CA (US); Oliver Po, San Jose, CA (US); V. Hakan Hacigumus, San Jose, CA (US)

(73) Assignee: NEC Laboratories America, Inc., Princeton, NJ (US)

( * ) Notice: Subject to any disclaimer, the term of this patent is extended or adjusted under 35 U.S.C. 154(b) by 251 days.

(21) Appl. No.: 12/873,269

(22) Filed: Aug. 31, 2010

(65) Prior Publication Data

US 2011/0246448 A1    Oct. 6, 2011

Related U.S. Application Data

(60) Provisional application No. 61/258,087, filed on Nov. 4, 2009.

(51) Int. Cl.
*G06F 17/30*    (2006.01)
(52) U.S. Cl.
USPC ............................................. 707/718; 706/19

(58) Field of Classification Search
USPC .............................. 707/713–714, 718; 706/19
See application file for complete search history.

(56) References Cited

U.S. PATENT DOCUMENTS

| 2007/0250470 A1* | 10/2007 | Duffy et al. ........................ 707/2 |
| 2009/0319486 A1* | 12/2009 | Surlaker et al. .................... 707/3 |
| 2010/0005077 A1* | 1/2010 | Krishnamurthy et al. ......... 707/4 |
| 2010/0070448 A1* | 3/2010 | Omoigui ........................ 706/47 |

OTHER PUBLICATIONS

Srivastava et al, Query Optimization over Web Services, VLDB '06, Sep. 12-15, 2006, Seoul, Korea.
Burge et al, Ordering Pipelined Query Operators with Precedence Constraints, VLDB '06, Sep. 1215, 2006, Seoul, Korea.

* cited by examiner

*Primary Examiner* — John Breene
*Assistant Examiner* — Joshua Bullock
(74) *Attorney, Agent, or Firm* — Joseph Kolodka

(57) ABSTRACT

Systems and method are disclosed for query optimization in a scale-out system with a single query processing machine and a distributed storage engine to store data by receiving a query rewritten for an internal schema; optimizing a query execution plan for the query; and executing the plan and returning result to an application.

2 Claims, 7 Drawing Sheets

DATABASE DISTRIBUTION SYSTEM AND METHODS FOR SCALE-OUT APPLICATIONS

This application claims priority to Provisional Application Ser. No. 61/258,087 filed Nov. 4, 2009, the content of which is incorporated by reference.

BACKGROUND

The present invention relates to query optimization in database distribution systems.

Key value stores have been recently used for scale-out (horizontal scaling) data management, especially for web applications. Data is divided into small data fragments and distributed over multiple storage nodes. A key is associated with each fragment of the data, and the key-value store provides key-based operations (such as put and get) that enable an application to access data fragments by key without knowing their physical location. Key-based operations provide an abstraction layer of the data and make it possible to scale out data stores: the system can easily add and remove storage nodes without disrupting applications that access the data using such operations.

However, the key-based operations also make it non-trivial to efficiently process more complicated data access, such as a relational query including join. A traditional relational database management system (RDBMS) often relies on various ways to access data stored on disks. Especially a scan operation takes a key role to let the RDBMS efficiently read a set of data in a table. Unfortunately, key-value stores usually do not support such scan operators. A query must be executed using only key-based lookup operations (i.e., get operations) to retrieve data fragments one by one, which can be much more expensive than a scan operator due to response time overhead of each operation.

On the other hand, one of the inherent features of such stores is the capability of responding to multiple requests in the same time, i.e. parallelizing the requests processing. In systems that use key-values stores for the backend storage while providing a relational interface to the applications, the query optimizer of the relational queries should be able to take advantage of the parallelization capabilities of the underlying key values stores.

One challenge here is to make optimization aware of effective parallelism: the degree of parallelism that is effective to faster execution time. Parallel key lookup is effective if it can hide latency of each lookup, but excessive parallelism does not improve performance if the query execution is already busy (i.e., it becomes CPU bound). The effective parallelism depends on the ratio between the response time of key lookup and the computation time of a query, which differs in different environments. Thus an automated approach based on optimization is crucial to efficiently execute a query on key value stores.

SUMMARY

Systems and method are disclosed for query optimization in a scale-out system with a single query processing machine and a distributed key-value storage engine to store data by: deciding the best ordering and parallelization scheme of the different operators in the query execution plan, the optimizer should output the plan that takes the shortest time to answer the query.

In another aspect, systems and methods are disclosed for query optimization in a scale-out system with a single query processing machine and a distributed storage engine to store data by receiving a query rewritten for an internal schema; optimizing a query execution plan for the query; and executing the plan and returning result to an application.

Advantages of the preferred embodiment may include one or more of the following. The preferred embodiment provides a solution for the query optimization problem in the context of a scale-out data management system. The execution plans produced by the invention run much faster than plans that may be produced without special care for optimization that takes into account the special nature of the scale-out system and its effective parallelization capacity. Notice that the number of effective parallelism can be different in different environments (e.g., different data centers) and that optimization of a query with parallelism in consideration would be a difficult and tedious task without automation that is enabled by the invention. Faster query execution means faster applications, better resource utilization, and more satisfied customers. It also means better throughput i.e. more queries and thus more profit. The produced plan also assumes only very basic interface of the storage engine, thus it can run on very scalable storage engines with basic key-value interface. This means that the system provides flexible and cheap scaling capability, which is needed by many modern applications, such as web applications and Software-As-a-Service applications where the number of queries to the system can grow and shrink very quickly and thus the data management system should be able to elastically grow and shrink with no major rebuilding required. The system provides higher scalability for web application with less engineering effort (i.e., fast and inexpensive). Combined with cloud computing infrastructure, it enables elastic resource management of web applications for evolving workloads. The system achieves the fundamental advantage of relational systems: physical data independence, while enjoying the scale-out and reliability of the modern storage engines.

DESCRIPTION

Figure 1A:
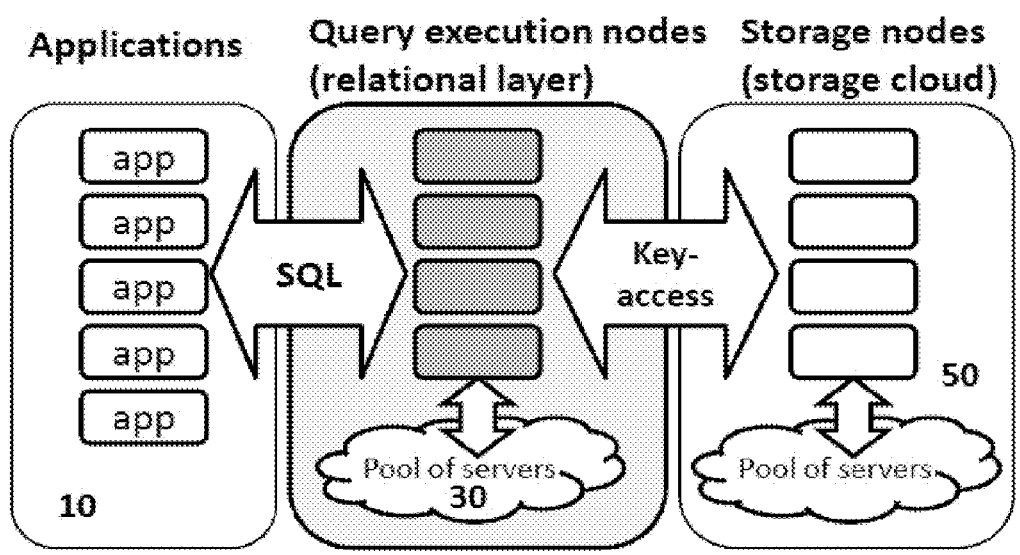
FIG. 1A shows an exemplary architecture of a runtime system in accordance with the present inventive framework.

FIG. 1A shows an exemplary architecture of a runtime system in accordance with the present inventive framework. The system consists of a middle layer providing query execution nodes between application nodes and storage nodes. The applications 10 send database requests such as SQL queries to the query execution layer, which runs on one or more servers 30. This layer intermediates between the applications layer and the storage engine layer 50, which is composed of one or more storage servers running as a key-based scalable storage system. A query execution node automatically transforms each SQL query into key-based operations supported by the storage.

The system of FIG. 1A supports a scheme, called microsharding, which automatically maps relational workload to distributed storage designed for scaling out. The scheme leverages the relational model to provide physical data independence, and still preserves the benefit of the key-value store in terms of scalability. It provides an abstraction layer with external and internal schemas. The external schema is relational, with a relational query workload defined over it, whereas the internal schema, which is transparent to the applications, specifies the data organization on top of the scale-out storage engine.

A query execution plan is represented as a navigation pattern that retrieves/stores the required microshards. To leverage the distributed storage platform for efficiency (in addition to scalability), the query engine exploits parallelism to overlap the storage requests.

Figure 1B:
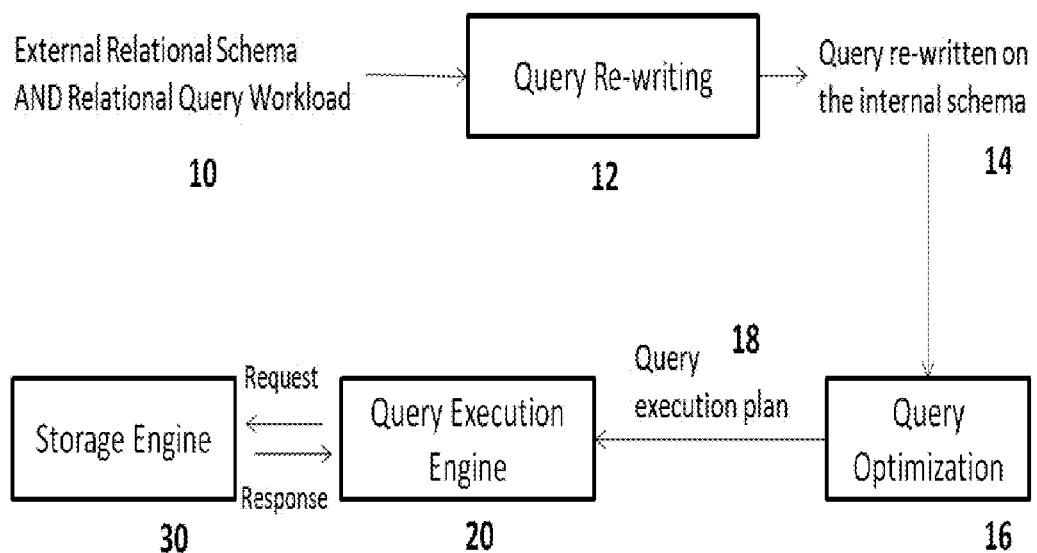
FIG. 1B shows an exemplary process to determine an optimal query execution plan for a given external relational schema and relational query workload.

FIG. 1B shows an exemplary process to determine an optimal query execution plan for a given external relational schema and relational query workload. In this process, the external relational schema and relational query workload is provided as input (10). The query is rewritten in 12 to generate a rewritten query on an internal schema (14). The query is optimized in 16 (as shown in more details in FIG. 1D). A query execution plan is done in 18 and presented to a query execution engine in 20. The query execution engine communicates with a storage engine through one or more requests/responses at 30.

Figure 1C:
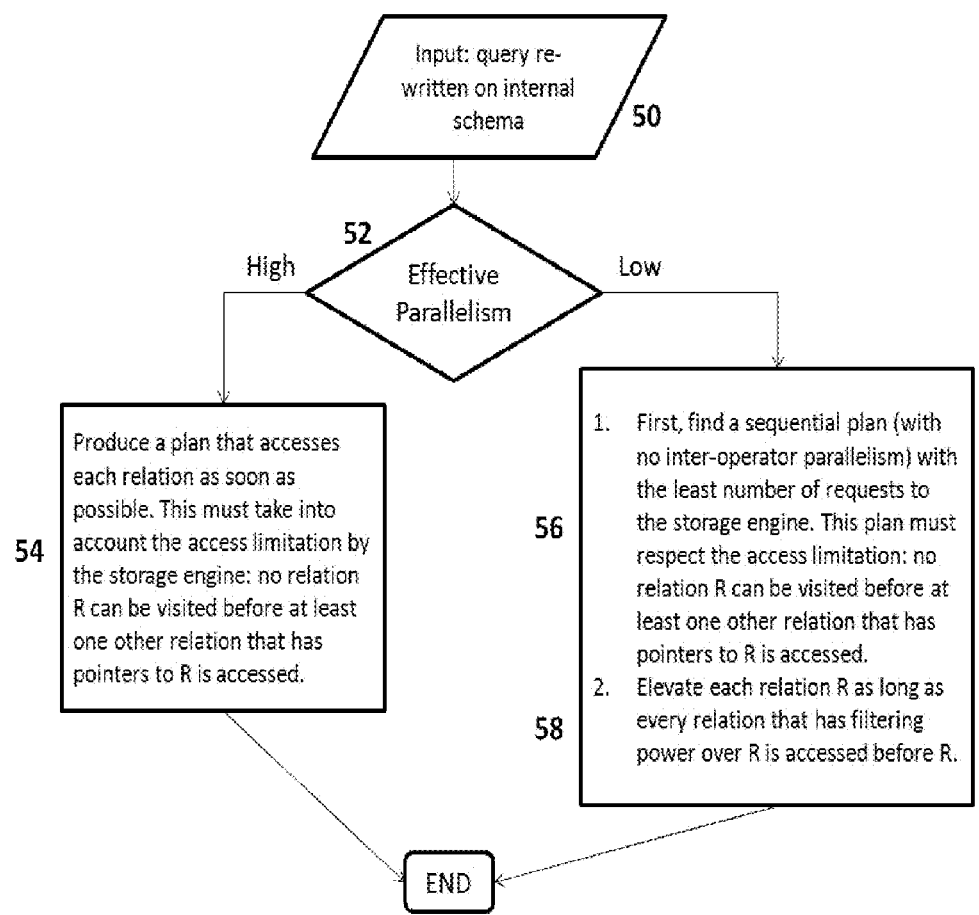
FIG. 1C shows an exemplary process for parallel query optimization.

FIG. 1C shows an exemplary process for parallel query optimization. The process receives a query rewritten on the internal schema in 50. The process checks if parallelism can be done in 52. If parallelism is high, the process produces a plan that accesses each relation as soon as possible. The access limitation by the storage engine is controlled so that no relation R can be visited before at least one other relation that has pointers to R is accessed in 54.

From 52, if the query has low parallelism, the process determines a sequential plan (with no inter operator parallelism) with the least number of requests to the storage engine. The plan must respect the access limitation that no relation R can be visited before at least one other relation that has pointers to R is accessed in 56. The process elevates each relation R as long as every relation that has filtering power over R is accessed before R in 58.

The architecture in FIGS. 1A-1C covers a variety of scenarios. One scenario is a typical web application where applications, query execution nodes, and storage nodes are deployed in the same data center. In this case, the application service provider will scale out all the nodes together using the resource pool of the data center. In a different scenario, the application and query execution nodes may be located at the client side (e.g. running on the users' browsers), accessing the distributed storage through the Internet. In this case, query execution nodes naturally scale out as the number of clients grows, and the data provider can scale out the storage nodes simply by adding new machines.

The average response time per request for the storage engine depends on factors decided by the specific instantiation of the architecture. In an environment where both storage nodes and query nodes are located in the same rack, it can be less than a few microseconds, but on cloud environments, the response time can be in the second range. When the response time is relatively large (with respect to the computation time), the query engine can issue multiple requests in the same time using multiple threads, as a latency-hiding mechanism.

In one embodiment, the storage engine supports the following functionalities:
Key-based read/write. Data read/write operation with specifying a key must be supported. Structured data access for each key (e.g., read/write a set of columns of a single row) can be optionally supported. A scan operation is not required.
Update atomicity. Atomic update must be supported within the data associated with a single key, i.e. a microshard in our scheme.
Durability and availability. The storage is responsible of durability and availability of the data.

One exemplary implementation runs on top of one of the simplest key value stores, Voldemort, which is an open source implementation of Amazon Dynamo and supports simple put/get operations to store/retrieve a binary data item associated with a key. Each microshard is encoded as a nested data object and represent it as a key-value object in binary format.

The Dynamo model implements eventual consistency by supporting concurrent versions for each data item. However, in order to satisfy the microshard atomicity requirement, the system uses the strong consistency setting: R+W>N, where R and W are respectively the numbers of replicas for a single read and write operation, and N is the total number of replica for each key. Concurrent updates are detected and prevented by the storage engine, based on the version number (i.e. optimistic concurrency control).

The general architecture of FIG. 1A is applicable to distributed storage engines that support more powerful operations on structured data (e.g. retrieve only part of the microshard). Such engines can enable more efficient query execution, whereas the Dynamo-based implementation needs to read/write the entire microshard. In general, the query optimizer should incorporate such capabilities in the search space and the cost estimation.

The relational workload given to the system includes a relational schema, also referred to as external schema, and a workload of conjunctive query templates. An external schema is given as a directed multigraph D=<R,F> where the set of vertices R represents a set of relations, and the set of edges F represents the foreign key references between relations.

Figure 2:
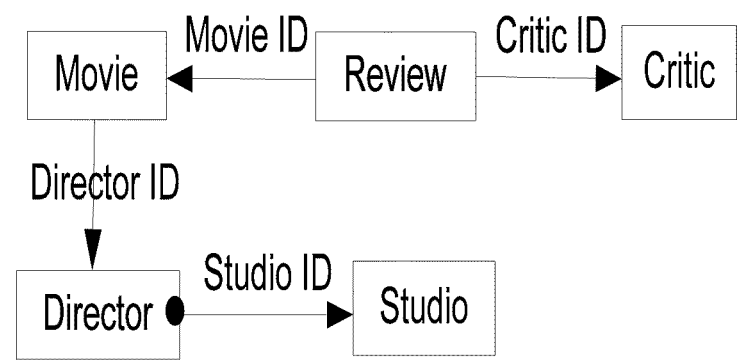
FIG. 2 shows an exemplary relational schema serving as a running example for an external schema.

An exemplary relational schema serving as a running example for the external schema is shown in FIG. 2. The arrows on the relational schema represent the foreign key references (pointers) between relations. A bubble on some side of an arrow indicates that some tuples of the relation at that side may not be involved in any relationship with the tuples of the relation at the other side. For example, a Director may not be affiliated with any specific Studio.

A query workload is given as a set of query templates. In this example, the system supports conjunctive queries, formulated as:

$$q(t_1, \ldots, t_n) \leftarrow I(v) \wedge R_1(t_1) \wedge \ldots \wedge R_n(t_n) \wedge c(t_1, \ldots, t_n, v)$$

The term $I(v)$ represents the parameters used to instantiate the query template at runtime.
Each term $R_i(t)$ denotes that t is a tuple in relation $R_i$ ($R_i \in R$).
The complex term $c(t_1, \ldots, t_n, v)$ comprises the join conditions. It is a conjunction of terms, each of which is in the following form: $t_i.a_k = t_j.a_l (t_i, t_j \in \{t_1, \ldots, t_n, v\})$. For brevity, c denotes the set of these terms.
The join condition c also gives an undirected multigraph, called a join graph Join(q), where the vertices represent a set of relations in q, and the labeled edges represent the join condition c. A relation that occurs more than once in q would have multiple vertices (nodes) in Join(q), one for each occurrence. Each value-based equality selection condition in the query (e.g. $R_i.a=100$) is represented as a join with the parameters term I. Non-value-based selection conditions (e.g. $R_i.a=R_j.b$) can be simply represented as annotation on vertices in Join(q). Thus, all the conditions in q are captured in Join(q), and Join(q) is used to analyze and reason about q.

For illustration and experimentation, a simple query workload over the schema of the running example in FIG. 2 is discussed next.

Query-3: Given type, find movies along with their reviews, such that movie's director is affiliated with studios in some given location.
SELECT * FROM Movie, Review, Director, Studio
WHERE Movie.Type=? AND Studio.Location=? AND
Movie.ID=Review.Movie AND
Director.ID=Movie.Director AND
Studio.ID=Director.Studio In each query, '?' represents a parameter in the query template, which is replaced by value at runtime. Turning now to considerations for the internal schema, the internal schema describes how the database is organized on top of the storage. The schema per-se does not specify how the data is physically distributed on the storage nodes, which is left to the storage engine to manage. This separation of concerns enables the storage engine to achieve the scalability and reliability.

A microshard is the unit of data exchange between the query execution engine and the storage engine, each microshard is accessed by its key, which is the key of the root relation. This explains why atomic access for transactional processing is possible on the tuples that belong to a single microshard.

Figure 3A:
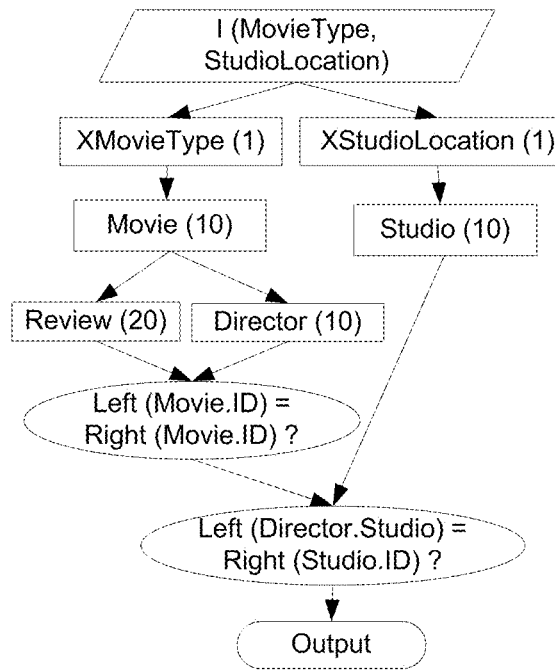
FIGS. 3A-3B illustrate one execution plan for exemplary query Query-3.

Query execution can exploit the distribution of the storage engine and issue multiple requests in parallel. In general, there are three possible types of parallelism:
1—Intra-operator parallelism. Multiple pointers (requests) to the same relation can be issued in parallel. For example, FIG. 3A shows an execution plan for Query-3 in which 10 Movie microshards can be retrieved in parallel from a single microshard of the index XMovieType. (e.g. from one Movie microshard, multiple Review microshards can be retrieved in parallel).
2—Inter-operator parallelism. Microshards that belong to different relations can be accesses in parallel, if they are independent. For example, an execution plan for Query-3 may retrieve Movie and Studio microshards (using appropriate indexes) in parallel starting from the parameter I. FIG. 3A shows such a plan.
3—Pipeline parallelism. For example, in FIG. 3B, for each Movie microshard, the associated Review microshards can be retrieved without waiting for the other Movie microshards to be retrieved.

Figure 3B:
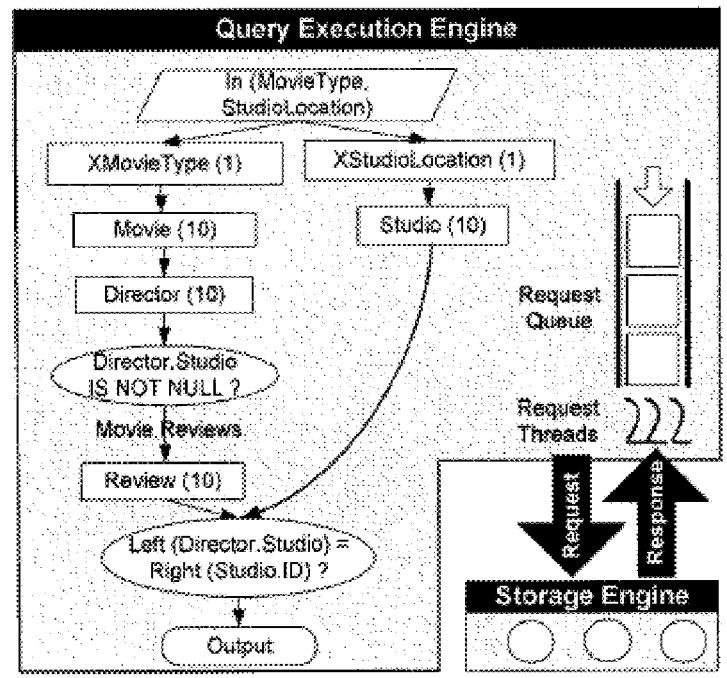

Each execution plan has two types of operators: (1) Get operators: used to retrieve microshards from the storage engine and joining them to other microshards retrieved on the same path (from root) on the plan. (2) Merge operators: used to join the retrieved microshards on different paths in the plan (after inter-operator parallelism). In FIG. 3B, Get operators are illustrated as rectangles, with the name of the relation and the expected number of retrieved microshards, while Merge operators are illustrated as ellipses with the join conditions.

To formalize, the condition that a partial order can generate an executable plan is discussed and a set of operators with which a plan is generated from a given partial order is also discussed.

Given a query q re-written over the internal schema, the set of executable plans is given as follows. A query plan p is a partial order $<_p$ of relations that appear in $Nav_d(q)$, including indexes. If the keys of relations is available at the time of retrieval, then a plan p is executable if and only if for every relation r (except the input parameter I), there is at least one relation s such that $s<_p r$ and there exists an edge from s to r in the navigability graph. If two relations s and r have no order relation between them, then there is inter-operator parallelism between the operators retrieving s and r. A linear plan is a special case where $<_p$ is a total order, i.e. there is no inter-operator parallelism.

Given a partial order of the query relations and the join graph, a query plan can be constructed as a DAG of operators of two types: Get and Merge. For a relation r in plan p, the ancestors A(r) is defined as the set of relations s such that $s<_p r$. The parents P(r) is defined as the set of relations $a \in A(r)$ such that ó relation s' such that $s<_p s'<_p r$ and $AS(r)=A(r) \cup \{r\}$ ("ancestor-or-self"), and Leaves($<_p$) ("leaf nodes") be a set of relations that are not ancestors of any other relations (i.e. the maximal relations in $<_p$). The parameter I is the only "root" (the minimal relation in $<_p$).

Access to each (nested) relation is done by some Get operator, represented by a rectangle in FIG. 3A or 3B. The operator retrieves microshards of the relation based on the information available from the ancestors. Consider Query-2 over the internal schema (b). At the moment of retrieval from the nested relation Movie[Review], the related tuples in all its ancestors are already retrieved: I, Critic, and XMovieReview. The information available at this point can be logically described as the following query result Qa:
SELECT INTO Qa FROM Critic, XMovieReview
WHERE Critic.ID=? AND XMovieReview.ReviewID
IN Critic.ReviewIDs Thus, the Get operator is logically equivalent to the output Qb of the following query that joins Qa and Movie [Review]:
SELECT INTO Qb FROM Movie, Movie.Review as Review, Qa WHERE Movie.ID=Q1.MovieID AND Review.ID=Q1.ReviewID This query is executable since the values of Movie.ID are provided from Qa. Note that we use Qa and Qb to describe the input and output of the Get operator only for logical reasoning; Qa does not need to be actually materialized before executing Qb.

Merge operators, represented by ellipses in FIG. 3A-3B, are used to combine flows from data streams that have been parallelized by inter-operator parallelism. They are used in two scenarios: (1) If a relation r in p has more than one parent, a Merge operator is used to combine streams from the parents before retrieving r. (2) to combine parallelized streams to give a unified output stream.

Formally, a plan can be constructed from operators as follows.
Get operators: For every relation r, create a Get operator that generates q, by joining r with the data retrieved from A(r), denoted as $q_{P(r)}$ $$q_r(v,t) \leftarrow q_{P(r)}(v) \wedge r(t) \wedge c(v,t)$$

where c is a subset of edges of the join graph that connect r and a relation in AS(r)
Merge operators: For every relation r such that |P(r)|>1, create a Merge operator that generates $q_P(r)$. For simplicity, we only show a case of a binary merge operator.

$$\{P(r)=p_1,p_2\}: q_{\{p_1,p_2\}}(v_1,v_2) \leftarrow q_{p_1}(v_1) \wedge q_{p_2}(v_2) \wedge c(v_1,v_2)$$

where c is a subset of edges of the join graph that connect a relation in $AS(p_1)-AS(p_2)$ and a relation in $AS(p_2)-AS(p_1)$. Note that $q_{p_1}(v_1)$ and $q_{p_2}(v_2)$ have the common attributes (that are inherited from the common ancestors between $p_1$ and $p_2$) that work as natural join conditions. A Merge operator is also created to merge the streams from Leaves($<_p$) to give a single output stream., i.e. to generate $q_{Leaves(<_p)}$.

The result is an execution plan that starts with the root $I \equiv q_1$ and ends with $q \equiv q_{Leaves(<_p)}$.

For update queries, Update/Insert/Delete operators are provided in a manner similar to Get operators. They are applied on a single (nested) relation and the key of root relation must be provided to execute.

Unlike the case of traditional parallel databases, the distributed storage nodes support a limited operation, and a single query node coordinates the parallel execution. The system supports a homogeneous environment where access pattern to a data source is limited to key-based retrieval, and the response time of requests is critical. The data sources are given from heterogeneous providers in their case: they address the problem specifically for the case where each data source (i.e., web service) has its own limited bandwidth. The system extends RDBMS to enjoy distributed storage that automatically scales out. To achieve high-performance transaction processing for constant workloads, the RDBMS can be built on a tightly-coupled cluster architecture where large scale analytic queries can be processed well by a shared nothing parallel architecture with storage that is optimized for data scan.

The instant framework can support a single-sited transaction, which refers to the case when a transaction accesses data only within a single node of a database cluster. The typical case is when the data is partitioned by reference (i.e., based on a tree of 1-to-n relationships) and a transaction accesses only a tree of tuples in a partition. Microsharding works as partitioning by reference to support this case. Microsharding also provides physical data independence of the relational model.

The execution time of each query in the workload varies under different internal schema designs. In general, the design should be chosen based on the relative importance (e.g. frequency) and the performance (execution time) of each query under each design. To enumerate the space of the possible denormalization schemes, a greedy heuristic is used. Each parent-child relationship in the relational schema—with the foreign key defined as NOT NULL—is represented by a binary variable, value 1 means denormalize and value 0 means do not denormalize. The constraint that each relation can be nested under at most one of its parents is captured by a constraint that at most 1 of the corresponding variables can be 1.

The search starts by setting all variables to 0. At each iteration, a single variable is chosen to be set to 1, if it does not break the above constraint. Then the overall cost of the workload (weighted sum) is estimated, assuming all the relevant indexes—as defined above—are available. The search continues until there is no improvement in the overall cost. Then the denormalization scheme of the last iteration is used, and all the relevant indexes that have not been used by the query optimizer in the last iteration are removed.

In addition to considering a more sophisticated space enumeration scheme, other factors can be used in the optimization heuristic. For example, denormalization should not be overdone in a way that results in too large microshards, which may be incompatible with the the underlying storage engine. Also, excessive denormalization may cause write=lock contention on the microshards since a single microshard would be accessed by multiple transactions.

Given an executable query over the internal schema, a query execution engine navigates through (nested) relations starting from the parameter node I. Information retrieved from one relation is used to further retrieve data from other relations. There are two major factors for an efficient query plan: (1) the number of requests to the storage (total retrieval cost) (2) parallelism of requests. While the former is common in general query optimization problems (e.g., the number of pages read from disk storage), the latter is also important when the storage latency is large compared to the local computation time.

To illustrate parallelism in a query execution plan, one approach is to find a left-linear join plan with the minimum execution cost. In this case this corresponds to a linear order of relations starting with the parameter relation I: called a linear plan. There are several types of parallelism:

Intra-operator parallelism. multiple pointers (requests) to the same relation can be issued in parallel. (e.g. from one Movie microshard, multiple Review microshards can be retrieved in parallel).

Pipeline parallelism. For each Review microshard, the associated Critic microshard can be retrieved without waiting for the other Review microshards to be retrieved.

In addition, non-linear plans feature a third form of parallelism: inter-operator parallelism. For example, an execution plan for Query-3 may retrieve Movie and Studio microshards (using appropriate indexes) in parallel starting from the parameter I. However, unlike the first two forms, inter-operator parallelism may increase the total number of requests (retrieved microshard) for the same query. Thus, there is a trade-off between total cost and execution time that can be optimized, as discussed below In the model a query execution engine node can access the remote data only by key. Also, in one embodiment, the data processing within a query execution node is negligible compared to the cost of the remote data access. Thus, the main difference between the plans is in the (partial) order in which they access the relations.

To formalize the search space, the condition that a partial order can generate an executable plan is discussed. Given a query q re-written over the internal schema, the set of executable plans is given as follows. A query plan p can be viewed as a partial order $<_p$ of relations that appears in q, including indexes. Note that the keys of relations must be available at the time of retrieval. Then a plan p is executable if and only if for every relation r (except the input parameter I), there is at least one relation s such that $s<_p r$ and there exists an edge from s to r in the navigability graph. If two relations s and r have no order relation between them, then there is inter-operator parallelism between the operators retrieving s and r. A linear plan is a special case where $<_p$ is a total order, i.e. there is no inter-operator parallelism.

Given a partial order of the query relations and the join graph, we can construct a query plan as a DAG of operators of two types: Get and Merge.

For a relation r in plan p, we define the ancestors A(r) as the set of relations s such that $s<_p r$. We also define the parents P(r) as the set of relations a $\in A(r)$ such that ó relation s' such that $s<_p s'<_p r$. We also define $AS(r)=A(r)\cup\{r\}$ ("ancestor-or-self"). Also, let Leaves($<_p$) ("leaf nodes") be a set of relations that are not ancestors of any other relations (i.e. the maximal relations in $<_p$). The parameter I is the only "root" (the minimal relation in $<_p$).

Access to each (nested) relation is done by some Get operator. The operator retrieves microshards of the relation based on the information available from the ancestors. In Query-2 over the internal schema (b), at the moment of retrieval from the nested relation Movie[Review], the related tuples in all its ancestors are already retrieved: I, Critic, and XMovieReview. The information available at this point can be logically described as the following query result Qa:

SELECT INTO Qa FROM Critic, XMovieReview WHERE Critic.ID=? AND XMovieReview.ReviewID IN Critic.ReviewIDs Thus, the Get operator is logically equivalent to the output Qb of the following query that joins Qa and Movie[Review]:

SELECT INTO Qb FROM Movie, Movie.Review as Review, Qa WHERE Movie.ID=Q1.MovieID AND Review.ID=Q1.ReviewID This query is executable since the values of Movie.ID are provided from Qa. Note that we use Qa and Qb to describe the input and output of the Get operator only for logical reasoning; Qa does not need to be actually materialized before executing Qb.

Merge operators, represented by ellipses, are used to combine flows from data streams that have been parallelized by inter-operator parallelism. They are used in two scenarios: (1) If a relation r in p has more than one parent, a Merge operator is used to combine streams from the parents before retrieving r. A plan can be constructed from operators as follows:

Get operators: For every relation r, create a Get operator that generates q, by joining r with the data retrieved from A(r), denoted as $q_{P(r)}$ $$q_r(v,t) \leftarrow q_{P(r)}(v) \wedge r(t) \wedge c(v,t)$$

where c is a subset of edges of the join graph that connect r and a relation in AS(r)

Merge operators: For every relation r such that |P(r)|>1, create a Merge operator that generates $q_P(r)$. For simplicity, a binary merge operator is considered where P(r)={$p_1,p_2$}:

$$q_{\{p_1,p_2\}}(v_1,v_2) \leftarrow q_{p_1}(v_1) \wedge q_{p_2}(v_2) \wedge c(v_1,v_2)$$

where c is a subset of edges of the join graph that connect a relation in AS($p_1$)−AS($p_2$) and a relation in AS($p_2$)−AS($p_1$). Note that $q_{p_1}(v_1)$ and $q_{p_2}(v_2)$ have the common attributes (that are inherited from the common ancestors between $p_1$ and $p_2$) that work as natural join conditions. A Merge operator is also created to merge the streams from Leaves($<_p$) to give a single output stream., i.e. to generate $q_{Leaves(<_p)}$.

The result is an execution plan that starts with the root I≡$q_1$ and ends with q≡$q_{Leaves(<_p)}$.

For update queries, Update/Insert/Delete operators are similar to Get operators. They are applied on a single (nested) relation and the key of root relation must be provided to execute.

The query optimization considers the trade-off between maximizing inter-operator parallelism and minimizing the total retrieval cost. Given this trade-off, the system can apply various inter-operator parallelism: conservative and speculative parallelism.

It is possible in some cases to apply some degree of inter-operator parallelism without compromising the total retrieval cost. This is referred to as conservative parallelism. This strategy results in plans that may run faster than linear ones (if enough parallelism is available at runtime), and are guaranteed to never run slower than linear ones (because the total cost is not compromised).

It is also possible in some cases to achieve faster execution than linear or conservative plans, even when the inter-operator parallelism increases the total cost (speculative parallelism) since it makes some requests that may be avoided if they are delayed. An executable plan is called a conservatively parallel plan if it is the maximal conservative parallelization of some linear plan. An executable plan p is called a speculatively parallel plan if (1) it does not have an executable plan p' such that p'$\prec$ p and (2) it is not a conservatively parallel plan.

Given a query q and a specific internal schema design, there may be more than one execution plan (navigation pattern) to execute the query. Various heuristics to choose a plan based on the formulation of execution plans are discussed next.

Figure 4:
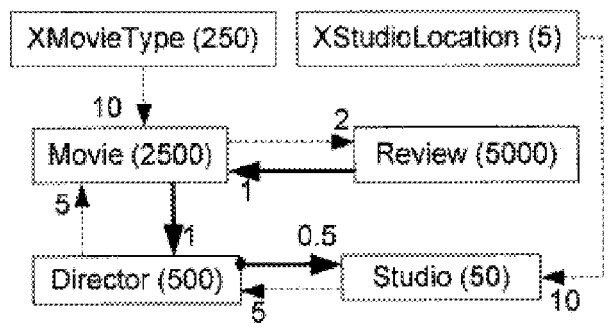
FIG. 4 shows an exemplary internal schema for the exemplary query Query-3.

In a running example, Query-3 is used with an internal schema shown in FIG. 4, which shows the part of the schema relevant to Query-3. The dashed arrows and boxes represent the indexes added to the relational schema in the access path addition phase. FIG. 4 also shows statistics of the database instance we generated. These numbers are straightforwardly used for the cost estimation of each Get operator, i.e. the expected number of requests to distinct microshards. The number in each relation (or index) represents the number of microshards of that relation. The data is generated such that each entry in either index (XMovieType and XStudioLocation) points to about 10 microshards of the corresponding relation. The number on the head of each arrow is the average number of pointers to the destination embedded in each microshard of the source. Obviously, this schema design allows for multiple navigation patters (i.e. partial orders), and thus multiple execution plans for Query-3.

Heuristic 1: Linear Plans.

In this heuristic, the difference in parallelism among plans is ignored and the system minimizes the expected total retrieval cost, which is estimated from the statistics of the database instance. First the system finds the modified (by the added indexes) navigability graph of q under the input internal design Nav(q), as shown in FIG. 4.

Figure 5:
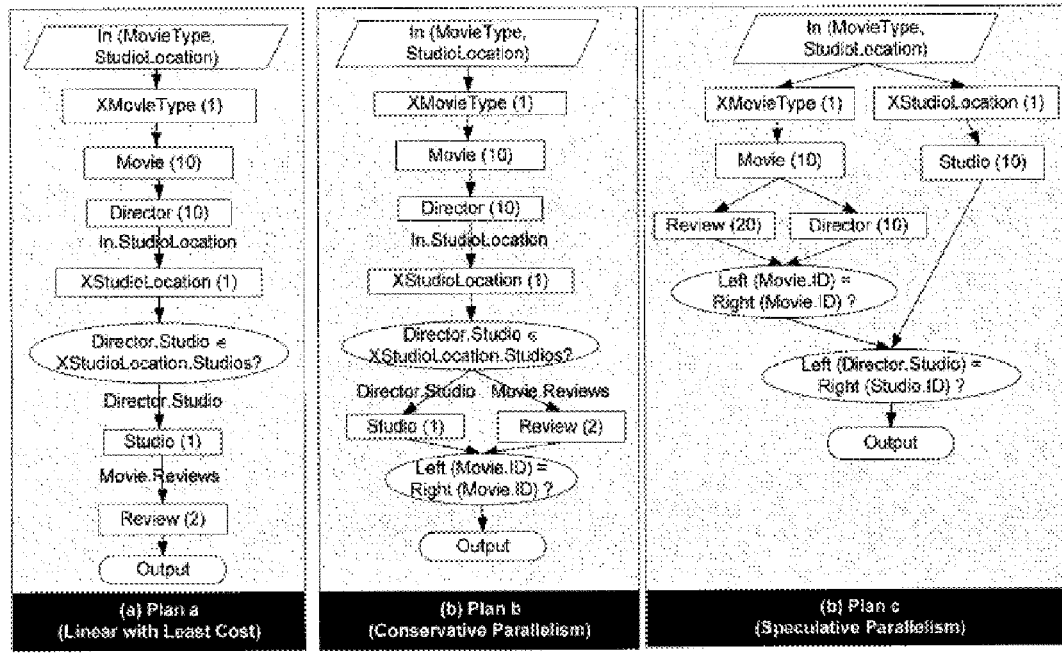
FIG. 5 shows various exemplary execution plans for the exemplary query Query-3.

Then, similar to the traditional System-R optimization, the system creates the best plans of n-relation join queries from the best plans of (n−1)-relation join queries. The key difference is that the system only considers n-relation join queries that are executable. Each node corresponds to executable n-relations and is associated with the cost of the best plan. The best linear plan is shown as Plan 1 in FIG. 5(a).

The process takes the number of requests to the storage as the cost. The retrieval cost for a relation r in a plan p, referred to as cost(r) is computed based on the set of relations s such that s<$_p$r and s has pointers to r in the modified navigability graph of the query. To estimate cost(r), given such relations s, the computation goes as follows: for each such relation s, let its total retrieval cost be cost(s), and let the number on the arrow s→r in the internal schema be pointers(s,r). Thus navigation from s to r would cost cost(s)*pointers(s,r) retrievals of r. If there are more than one such relation s, then the cardinality of the intersection of the pointers from all of them to r is estimated (using the cardinality of r as a universal set, and assuming independent distributions). This estimated cardinality is used as an estimate for cost(r).

Note that from IMD to IMSD, XS (XStudioLocation) is used to retrieve S (Studio) whereas Director already has the pointers to Studio. This is because this extra index has more pruning power on Studio: one request to get XStudioLocation reduces the requests on Studio from 5 to 1.

Heuristic 2: Conservatively Parallel Plans.

A conservatively parallel plan introduces inter-operator parallelism without sacrificing the total retrieval cost. Thus one heuristics is to (1) find a linear plan with Heuristic 1, and (2) apply conservative parallelization to it. In this example, given the best linear plan Plan 1, the system can derive a conservatively parallel plan. The algorithm removes precedence relationships (Studio, Review), (Director, XStudioLocation) and (Movie, XStudioLocation). Additional Merge operators are inserted. The result is Plan 2 in FIG. 5(b).

Heuristic 3: Speculatively Parallel Plans.

A speculatively parallel plan starts retrieving data from relations as soon as possible hoping that it can finish execution earlier even if it retrieves more data than other plans do. An executable plan with minimal synchronization forms a tree of Get operators whose leaves are connected with a n-ary Merge operator (or a tree of binary Merge operators). The cost of Merge operators is negligible. Thus the system searches for a tree of Get operators with the minimum depth. Among the plans with the minimum depth, a plan that minimizes the expected total retrieval cost is selected.

In a different environment where the response time of the storage is shorter, the benefit of parallelism becomes small. There is a limit of the number of threads to be effective. Speculative parallelism should be introduced only when the effective number of threads is large enough to let a speculative plan outperform.

age range partitioning of the underlying storage (if available) (2) implement range indexes on top of the storage (using B-link trees on top of S3 where each key-value object corresponds to a tree node.) The range scan should be implemented in a transparent manner so that the choice between the above approaches is a matter of optimization.

Although constrained data denormalization that does not duplicate data among microshards is discussed, the system can also work with denormalization that involves distribution of duplicated data to improve read performance. Such materialized views are contemplated by the present inventors.

The distributed storage engines are being adopted as an alternative of an RDBMS where scaling out is crucial and the ACID properties are not mandatory. Such applications can benefit from the relational model, by leveraging physical data independence. The use of microsharding, a scheme of database distribution over such distributed storage, bridges between the recent needs of scale-out applications and the tradition of relational database technologies.

TABLE 1

Various linear execution plans for Query 3

| Category | Plan # | Order of Get Nodes | Expected Cost |
|---|---|---|---|
| 1-Use Only XMovieType | 1 | XMovieType(1) - Movie(10) - Review(20) - Director(10) - Studio(5) | 46 |
| | 2 | XMovieType(1) - Movie(10) - Director(10) - Review(10) - Studio(5) | 36 |
| | 3 | XMovieType(1) - Movie(10) - Director(10) - Studio(5) - Review(2) | 28 |
| 2-Use Only XStudioLocation | 4 | XStudioLocation(1) - Studio(10) - Director(50) - Movie(250) - Review(2) | 313 |
| 3-Use both XMovieType and XStudioLocation (not all plans shown) | 5 (from 1) | XMovieType(1) - Movie(10) - Review(20) - Director(10) - XStudioLocation(1) - Studio(1) | 43 |
| | 6 (from 2) | XMovieType(1) - Movie(10) - Director(10) - Review(10) - XStudioLocation(1) - Studio(1) | 33 |
| | 7 (from 3) | XMovieType(1) - Movie(10) - Director(10) - XStudioLocation(1) - Studio(1) - Review(2) | 25 |
| | 9 (from 4) | XStudioLocation(1) - Studio(10) - Director(50) - XMovieType(1) - Movie(1) - Review(2) | 65 |

TABLE 2

Execution time for different plans for Query 3

| | 5 | 10 | 15 | 20 | 25 | 30 |
|---|---|---|---|---|---|---|
| Plan a (LeastLinear) | 745 | 561 | 560 | 556 | 558 | 560 |
| Plan 2 (ConserPar) | 710 | 493 | 493 | 493 | 493 | 495 |
| Plan 3 (AggresPar) | 1198 | 654 | 539 | 436 | 438 | 328 |
| Plan 4 (Manual) | 1013 | 603 | 491 | 436 | 435 | 436 |

The application developers can specify transaction requirement as a tree of relations in the external schema, called a transaction tree. The internal schema takes this requirement into account. A transaction of the application is annotated with a transaction tree id when needed. A query in a transaction is still allowed to read data outside of the tree if the application logic can incorporate the resulting relaxed consistency. A typical example in an e-commerce scenario is updating a shopping cart in a transactional manner while referring to product information which might be stale.

There are multiple ways for the internal schema design to support a transaction tree: (1) put the entire transaction tree into a microshard (2) introduce a special microshard that serves as a buffer of transaction updates as a set of redo log records. A redo log records can be used to support atomicity.

The system can also handle range queries. There are two approaches to incorporate range scan in the scheme: (1) lever- The system may be implemented in hardware, firmware or software, or a combination of the three. Preferably the invention is implemented in a computer program executed on a programmable computer having a processor, a data storage system, volatile and non-volatile memory and/or storage elements, at least one input device and at least one output device.

Figure 6:
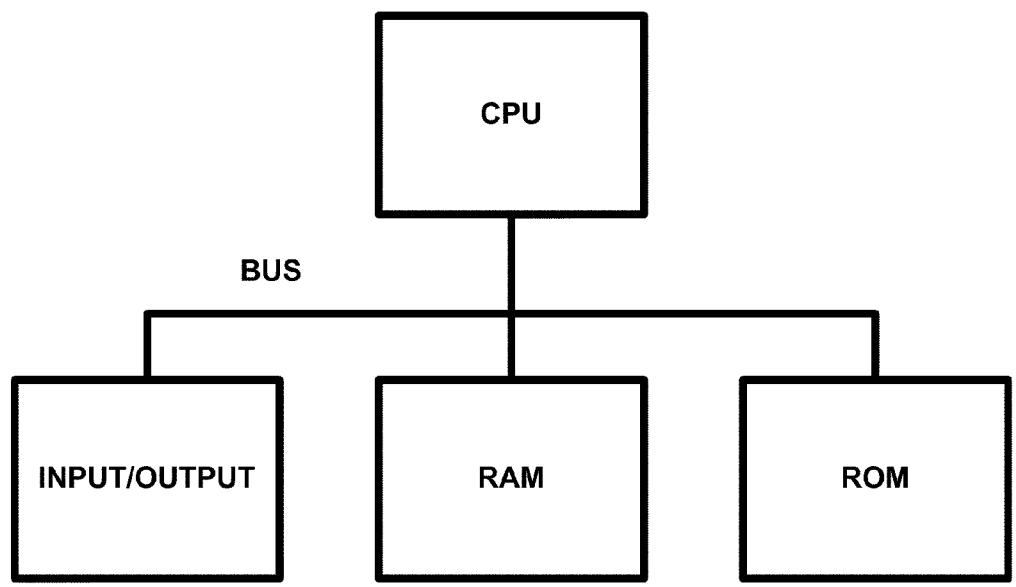
FIG. 6 shows a block diagram of a computer to support the system.

By way of example, FIG. 6 shows a block diagram of a computer to support the system. The computer preferably includes a processor, random access memory (RAM), a program memory (preferably a writable read-only memory (ROM) such as a flash ROM) and an input/output (I/O) controller coupled by a CPU bus. The computer may optionally include a hard drive controller which is coupled to a hard disk and CPU bus. Hard disk may be used for storing application programs, such as the present invention, and data. Alternatively, application programs may be stored in RAM or ROM. I/O controller is coupled by means of an I/O bus to an I/O interface. I/O interface receives and transmits data in analog or digital form over communication links such as a serial link, local area network, wireless link, and parallel link. Optionally, a display, a keyboard and a pointing device (mouse) may also be connected to I/O bus. Alternatively, separate connections (separate buses) may be used for I/O interface, display, keyboard and pointing device. Programmable processing system may be preprogrammed or it may be programmed (and reprogrammed) by downloading a program from another source (e.g., a floppy disk, CD-ROM, or another computer).

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

The invention has been described herein in considerable detail in order to comply with the patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

Although specific embodiments of the present invention have been illustrated in the accompanying drawings and described in the foregoing detailed description, it will be understood that the invention is not limited to the particular embodiments described herein, but is capable of numerous rearrangements, modifications, and substitutions without departing from the scope of the invention. The following claims are intended to encompass all such modifications.

What is claimed is:

1. A method for query optimization in a scale-out system with a single query processing machine and a distributed storage engine to store data, the method comprising:
    receiving a query rewritten for an internal schema;
    optimizing a query execution plan for the query;
    executing the query execution plan and returning result of the execution to an application;
    conforming to an access limitation imposed by the storage engine where no relation R can be visited before at least one other relation with one or more pointers to R is accessed; and
    elevating each relation R when every relation with filtering power over R is accessed before R,
    wherein the optimization includes:
        determining a first executable plan with a minimum number of requests to the distributed storage engine if an effective parallelism available to the query engine is below a predetermined threshold; and
        determining a second executable plan with a smallest depth, regardless of the total number of requests to be issued, if the effective parallelism exceeds the predetermined threshold, and
    wherein the query execution plan is configured to support intra-operator parallelism, inter-operator parallelism, and pipeline parallelism.

2. The method of claim 1, wherein the query execution plan runs on one machine while making parallel storage requests to the distributed storage engine having a plurality of machines.

* * * * *